United States Patent [19]
Jackson

[11] 3,872,779
[45] Mar. 25, 1975

[54] MANUFACTURE OF CIGARETTE FILTERS

[75] Inventor: Norman Walter Jackson, Sussex, England

[73] Assignee: Molins Limited, London, England

[22] Filed: Feb. 21, 1974

[21] Appl. No.: 444,425

[30] Foreign Application Priority Data
Feb. 26, 1973 United Kingdom ................ 9315/73

[52] U.S. Cl. ................. 93/1 C, 198/31 AA, 198/32
[51] Int. Cl. .......................... B65g 29/00, A24c 5/50
[58] Field of Search ...... 93/1 C, 77 FT; 198/31 AA, 198/32

[56] References Cited
UNITED STATES PATENTS

| | | | |
|---|---|---|---|
| 2,914,797 | 12/1959 | Cavanagh | 93/1 C UX |
| 3,010,561 | 11/1961 | Ricke | 93/1 C |
| 3,164,243 | 1/1965 | Rudszinat et al. | 93/1 C |
| 3,306,306 | 2/1967 | Rudszinat | 93/1 C X |
| 3,357,320 | 12/1967 | Sexstone et al. | 93/1 C |
| 3,550,750 | 12/1970 | Jackson | 198/31 AA X |
| 3,559,794 | 2/1971 | McConnell et al. | 198/31 AA X |

Primary Examiner—Roy Lake
Assistant Examiner—James F. Coan
Attorney, Agent, or Firm—Markva & Smith

[57] ABSTRACT

In the production of composite filter rod for use in the manufacture of cigarettes filter portions are fed onto the larger diameter end of a cone and travel around a spiral path towards the smaller diameter end from where they are delivered to a continuous wrapper web. Two endwise moving streams of filter portions may be fed tangentially onto the larger diameter end of the cone along separate paths which merge as they progress spirally up the cone. The streams are staggered so as to intercalate as they merge.

20 Claims, 4 Drawing Figures

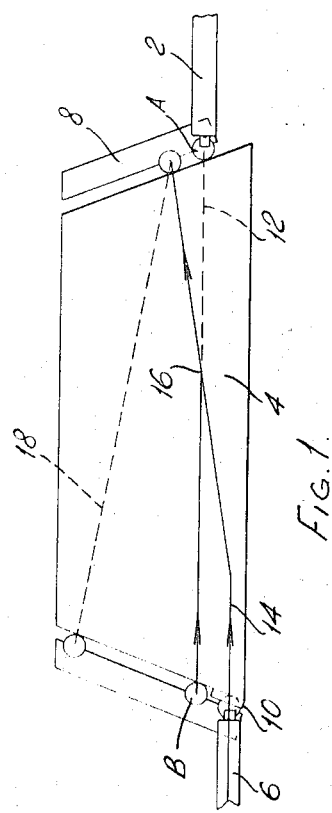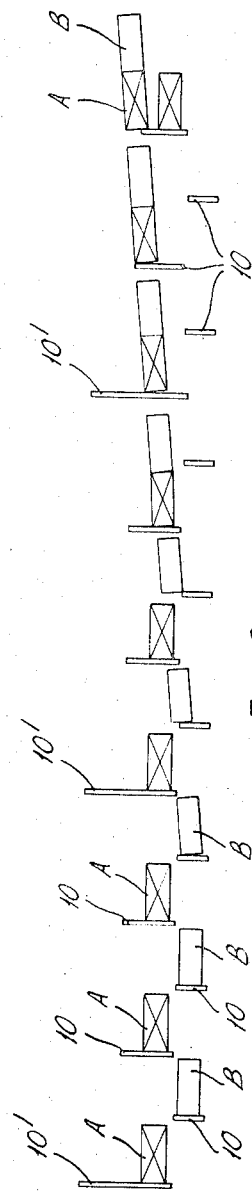

MANUFACTURE OF CIGARETTE FILTERS

This invention relates to a method of assembling rod-like articles. The invention concerns particularly the manufacture of a continuous rod comprising a continuous wrapper surrounding a succession of alternate filter portions of different materials. The rod is subsequently cut at regular intervals, for example through the middle of every second portion of one of the filter materials, to form filter rods which can then be used by a filter attachment machine which attaches sections of the rods to cigarette portions, each section including two half portions of the different filter materials.

This invention will be described with reference to the manufacture of a rod including only two different filter materials, but it should be understood that the invention can in principle be used also in the manufacture of a rod with three or more different filter materials. In general terms the continuous rod will be referred to as a "composite filter rod."

British Patent Specification No. 1,054,545 describes a machine for making a composite filter rod in which a truncated cone is used to space apart an endwise moving stream of filter portions. The filter portions are fed on to the cone at the small-diameter end of the cone and are guided around the cone by a spiral track formed in a member surrounding the cone, so that the filter portions move along a path which winds around the cone towards the large-diameter end, thus increasing the speed of the filter portions and spacing them apart.

The present invention provides a method of arranging rod-like articles in which at least two endwise-moving streams of rod-like articles are caused to move around a conical surface along separate paths which merge and progress spirally towards the lesser diameter end of said surface, the articles in said streams being staggered so as to intercalate as they merge. Thus the two streams are combined streams and also slowed down so as to close the gaps between them. Where the present method is to be used in the production of composite filter rod the continuous stream of alternate filter portions can subsequently be fed on to a continuous wrapper web.

Another aspect of the invention provides apparatus for arranging rod-like articles including means defining a conical surface, means defining at least two paths on said surface, said paths merging and progressing spirally from a larger diameter region of said surface to a smaller diameter region of said surface, and means for causing rod-like articles to progress along said paths in staggered relation so that articles intercalate as the paths merge.

The invention further provides apparatus for manufacturing cigarette filters comprising a rotatable cone, means defining at least one path around said cone, at least part of said path progressing spirally around said cone in a direction from the larger diameter end of the cone towards the smaller diameter end, a delivery wheel having its axis parallel to the axis of said cone and being arranged adjacent to the larger diameter end of said cone, whereby a stream of filter portions may be delivered tangentially by said delivery wheel onto said path at the larger diameter end of the cone, means on the cone for causing said filter portions to progress around said cone on said path, and means for delivering said filter portions from said path at the smaller diameter end of the cone to a continuous wrapper web to form the filter portions into composite filter rod.

An example of a machine according to the present invention will now be described with reference to the accompanying drawings. In these drawings:

FIG. 1 is a diagrammatic elevation of an embodiment of the invention including a cone;

FIG. 2 is a developed view of part of the cone of FIG. 1 showing the stream of filter portions merging;

Figure 3:
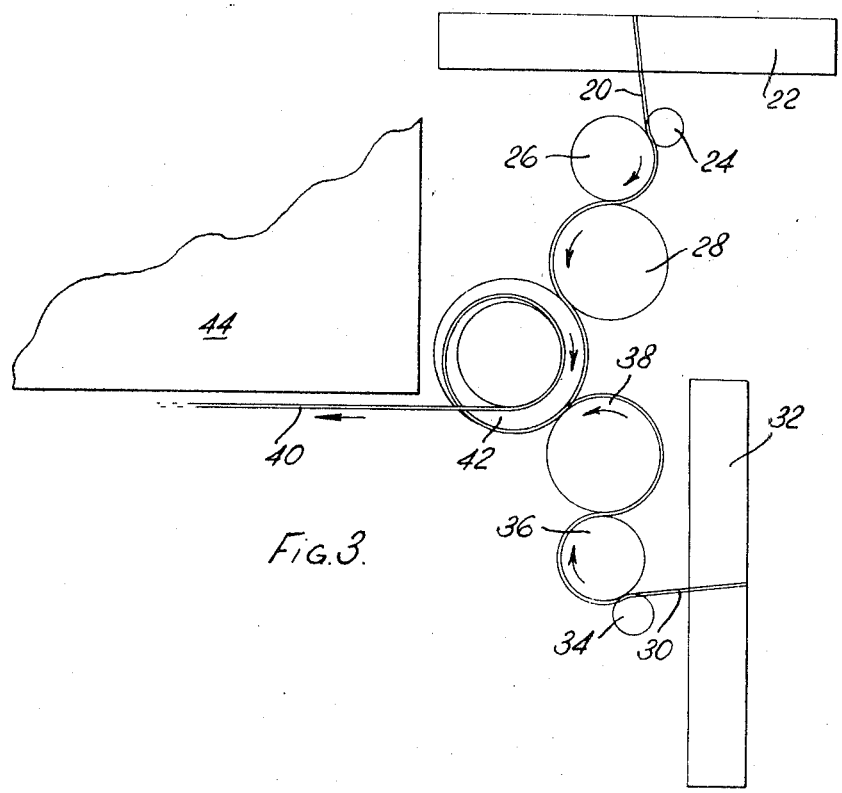
FIG. 3 is a diagrammatic view in plan of part of a machine for producing composite filter rod.

The term "cone" as used herein is intended to include within its scope a truncated cone.

Referring to FIGS. 1 and 2 a delivery wheel 2 delivers to a cone 4 a succession of spaced endwise-moving filter portions A, the axes of rotation of the cone 4 and wheel 2 being parallel to one another. Similarly, a delivery wheel 6 delivers a spaced endwise-moving stream of similar filter portions B. The delivery positions are shown 180° apart in FIG. 1 for the sake of convenience, but in fact the delivery points subtend an angle of less than 180° at the axis of the cone, as shown for example in FIG. 3 or 4.

The paths for the filter portions A and B and subsequently for the combined stream are defined by grooves in a stationary cowl 8. Motion of the filter portions along the grooves is provided by ribs 10 and 10' on the cone, as shown in FIG. 2. There are short ribs which pick up each filter portion as it arrives on the cone, but do not extend all the way up the cone, and there are longer ribs 10' which extend all the way up the cone. The filter portions are delivered by these longer ribs in groups of six at the upper end of the cone, but could alternatively be delivered in groups comprising any multiple of two.

FIG. 1 shows that the filter portions A move initially along a path 12 in a plane normal to the axis of the cone. The path 14 of the filter portions B is initially in a parallel plane but then bends upwards so as to merge with the path 12 at a point 16. From the merger point 16 the filter portions move along a path 18 which winds spirally up to the upper end of the cone. The arrangement is such that the groups of six filter portions are delivered from the upper end of the cone in end to end abutment and with the minimum clearance between the leading filter portion and the rib 10' driving the preceding group. Thus a substantially closed stream of alternating filter portions is delivered tangentially from the cone (by means not shown) and on to a continuous wrapper web which encloses the filter portions to form a continuous rod.

Figure 4:
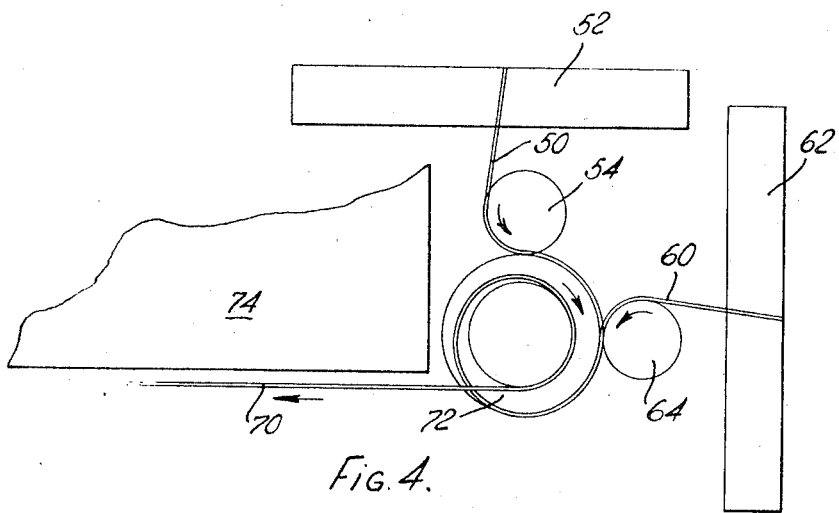
FIG. 4 is a similar view of part of another machine for producing composite filter rod.

FIGS. 3 and 4 illustrate how streams of spaced filter portions may be delivered to the cone.

In FIG. 3 hoppers 22 and 32 hold first and second types of filter portions respectively. Filter portions or groups of filter portions are delivered from the hoppers 22, 32 by chains to form continuous closed streams of filter portions as indicated at 20 and 30 respectively. The stream 20 is fed tangentially on to a wheel 24. This wheel 24 is in fact formed with a number of flats around its periphery, each of which corresponds in length to the length of a filter portion. Thus a V-shaped gap opens up between successive filter portions as they are carried by the wheel 24. A second wheel 26, rotating about an axis parallel to that of wheel 24, and at a higher peripheral speed, picks up filter portions from wheel 24 by means of small fingers which engage in the V-shaped gaps. The arrangement may be basically as shown in British Patent Specification No. 1,261,448, except that the wheel 26 preferably has fingers which enter the gaps so as to drive the filter portions positively. In the transfer between the wheels 24 and 26 the filter portions are preferably accelerated only slightly, for example so as to open up gaps between successive portions of about a quarter of the length of a filter portion. A third wheel 28 receives the filter portions from the wheel 26, and in doing so accelerates the filter portions further. Delivery of filter portions from hopper 32 is similar to that already described with reference to hopper 22 and in particular the operation of chain 30 and wheels 34, 36 and 38 is the same as the corresponding parts associated with hopper 22. It will be understood that suction is used to hold the filter portions on the various wheels where necessary.

Streams of filter portions are delivered from the wheels 28 and 38 to a cone 42, which may be identical with that illustrated in FIG. 1. Thus the wheels 28 and 38 may correspond to the delivery wheels 2 and 6 shown in FIG. 1. The cone 42 intercalates the streams of filter portions and delivers a substantially closed stream of alternating filter portions (as shown at 40) towards a machine bed 44 where the stream of filter portions is enclosed in a continuous wrapper web to form a continuous filter rod.

It should be noted that the peripheral speed of the lower end of the cone 42 may be greater than the peripheral speeds of the wheels 28 and 38 so that the filter portions are accelerated during transfer from these wheels to the cone, thus giving the required spacing of the filter portions as shown in FIG. 2. In this case, therefore, the filter portions are accelerated slightly at each transfer.

Referring now to FIG. 4, hoppers 52 and 62 hold first and second types of filter portions respectively. As before, continuous streams of filter portions 50 and 60 are delivered from the hoppers by chains. At the point of transfer of the stream 50 onto a delivery wheel 54 the filter portions are subjected to axial separation by use of pressure air to cause an air flow which separates adjacent filter portions so that the necessary spacing between the filter portions is achieved to allow direct feeding on to a cone 72. Similarly air separation is used at the point of transfer of the stream 60 on to a delivery wheel 64. One arrangement whereby axial separation of rod-like articles may be achieved by use of pressure air is described in British Patent Specification No. 955,431. After the spaced streams of filter portions have been delivered to the cone 72 they are intercalated and closed up as before and delivered in a substantially closed stream 70 to a machine bed 74 where they are enclosed in a continuous wrapper web. It will be appreciated that it is not necessary for the filter portions in the streams 50 and 60 to be subjected to the total axial separation required at the point of delivery on to the wheels 54 and 64: some of the separation may be achieved by arranging that the lower end of the cone 72 is rotating at a greater peripheral speed than the wheels 54 and 64.

In FIGS. 3 and 4 the initial closed streams of filter portions are shown as having been delivered directly from hoppers. In practice each stream may be formed by initially feeding longer filter portions into circumferentially spaced axial flutes on a drum on which the longer filter portions are cut to form, for example, four filter portions of the length shown; that is to say, the rods fed to the drum are four times as long as the filter portions A and B of FIGS. 1 and 2. Each group of four filter portions in turn is then pushed out of its flute by a chain to form a continuous closed stream of filter portions. Apparatus for feeding further portions from a fluted drum by means of a chain to form a continuous line of abutting filter portions is described and illustrated in British Patent Specification No. 876,733.

In another arrangement using a cone according to the invention streams of endwise moving filter portions may be intercalated on an intermediate wheel which subsequently feeds a single stream of alternating filter portions on to a cone. The cone may then be used simply to close the gaps between the alternating filter portions and to feed the filter portions at timed intervals on to a wrapper web.

I claim:

1. A method of arranging rod-like articles in which at least two endwise-moving streams of rod-like articles are caused to move around a conical surface along separate paths which merge and progress spirally towards the lesser diameter end of said surface, the articles in said streams being staggered so as to intercalate as they merge.

2. In a method of manufacturing cigarette filters, a method of arranging cigarette filters in which at least two endwisemoving streams of filters are caused to move around a conical surface along separate paths which merge and progress spirally towards the lesser diameter end of said surface, the filters in said streams being staggered so as to intercalate as they merge.

3. A method according to claim 1 wherein said streams are fed tangentially onto the conical surface.

4. A method according to claim 3 wherein said separate paths are initially in planes which are parallel and spaced axially relative to the axis of said conical surface.

5. A method according to claim 4 wherein each path is initially in a plane at right angles to the axis of the conical surface.

6. Apparatus for arranging rod-like articles including means defining a conical surface, means defining at least two paths on said surface, said paths merging and progressing spirally from a larger diameter region of said surface to a smaller diameter region of said surface, and means for causing rod-like articles to progress along said paths in staggered relation so that articles intercalate as the paths merge.

7. In an apparatus for manufacturing cigarette filters, apparatus for arranging cigarette filters including means defining a conical surface, means defining at least two paths on said surface, said paths merging and progressing spirally from a larger diameter region of said surface to a smaller diameter region of said surface, and means for causing filters to progress along said paths in staggered relation so that said filters intercallate as the paths merge.

8. Apparatus according to claim 7 wherein said conical surface is defined by a cone and said paths are defined by grooves in a member surrounding the cone.

9. Apparatus according to claim 8 wherein the cone is rotatably mounted relative to said member.

10. Apparatus according to claim 9 further comprising projecting ribs formed on said cone, said ribs being arranged to engage filters in said grooves and cause said articles to progress around said conical surface when said cone is rotated.

11. Apparatus according to claim 10 wherein some of the ribs extend only part of the way along the cone from the larger diameter end.

12. Apparatus according to claim 11 wherein the spacing of adjacent ribs at the small diameter end of the cone is substantially an integral multiple of the spacing of adjacent ribs at the large diameter end of the cone.

13. Apparatus according to claim 7 further comprising first and second delivery wheels having their axes parallel to the axis of said conical surface and arranged to feed first and second streams of filters tangentially onto the respective paths on said surface in staggered relation.

14. Apparatus according to claim 13 wherein said first and second delivery wheels are arranged so that the points of delivery onto said conical surface subtend an angle of less than 180° at the axis of said conical surface.

15. Apparatus according to claim 13 wherein said delivery wheels lie in separate planes at right angles to the axis of said conical surface.

16. Apparatus for manufacturing cagarette filters comprising a rotatable cone, means defining at least one path around said cone, at least part of said path progressing spirally around said cone in a direction from the larger diameter end of the cone towards the smaller diameter end, a delivery wheel having its axis parallel to the axis of said cone and being arranged adjacent to the larger diameter end of said cone, whereby a stream of filter portions may be delivered tangentially by said delivery wheel onto said path at the larger diameter end of the cone, means on the cone for causing said filter portions to progress around said cone on said path, and means for delivering said filter portions from said path at the smaller diameter end of the cone to a continuous wrapper web to form the filter portions into composite filter rod.

17. Apparatus for manufacturing cigarette filters comprising a cone, a coaxial member having an inner conical surface surrounding the cone, said cone and said member being mounted for relative rotation, grooves in the conical surface of said member opposed to the cone, at least two paths for filter portions around said cone defined by said grooves and the surface of said cone, said paths lying in separate planes in the region of the larger diameter end of the cone but merging and progressing spirally towards the smaller diameter end of the cone, first and second delivery wheels having their axes parallel to the axis of said cone and arranged in separate planes adjacent the larger diameter end of the cone to feed first and second streams of filter portions tangentially onto the respective paths in staggered relation, a plurality of ribs formed on the surface of said cone for causing filter portions to progress along said paths in staggered relation so that said filter portions intercalate as the paths merge and for causing said filter portions to progress spirally along said merged paths towards the smaller diameter end of the cone, and means for delivering said filter portions from said path at the smaller diameter end of the cone to a continuous wrapper web to form the filter portions into composite filter rod.

18. Apparatus according to claim 17 wherein said first and second delivery wheels are arranged so that the points of delivery onto the cone subtend an angle of less than 180° at the axis of said cone.

19. Apparatus for manufacturing cigarette filters comprising a cone, a member having an inner conical surface coaxially surrounding the cone, said cone and said member being mounted for relative rotation, grooves in the conical inner surface of said member opposed to said cone, first and second paths for filter portions defined by said grooves and the surface of said cone, said paths starting at or near the larger diameter end of the cone and merging and progressing together as one path spirally towards the smaller diameter end of the cone, first and second delivery wheels arranged adjacent the larger diameter end of the cone to feed first and second streams of filter portions onto the respective paths, a first set of ribs on said cone adjacent the larger diameter end for causing filter portions in said first stream to progress around said cone on said first path, a second set of ribs on said cone adjacent the larger diameter end for causing filter portions in said second stream to progress around said cone on said second path, the ribs in said first and second sets being staggered so that the filter portions intercalate as said first and second paths merge, some of the ribs in the second set of ribs extending along the cone to the smaller diameter end to cause groups of filter portions to progress spirally along said merged paths towards the smaller diameter end of the cone, and means for delivering said filter portions from the smaller diameter end of the cone to a continuous wrapper web to form the filter portions into composite filter rod.

20. Apparatus according to claim 19 wherein every third rib in the second set of ribs extends along the cone.

* * * * *